(12) United States Patent
Funk et al.

(10) Patent No.: US 6,382,710 B1
(45) Date of Patent: May 7, 2002

(54) VEHICLE STRUCTURE

(75) Inventors: Micheal Funk, Leoberg; Herbert Klamser, Grafenau; Peter Lehmann, Stuttgart; Christiaan Burgers, Heimsheim, all of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/709,644

(22) Filed: Nov. 13, 2000

(30) Foreign Application Priority Data

Nov. 11, 1999 (DE) .......................... 199 54 296

(51) Int. Cl.⁷ .............................................. B62D 25/20
(52) U.S. Cl. ..................... 296/189; 296/204; 296/188
(58) Field of Search .................... 296/30, 187, 188, 296/189, 204

(56) References Cited

U.S. PATENT DOCUMENTS

| 4,081,197 A | * | 3/1978 | Ackel ......................... 296/204 |
| 4,514,008 A | * | 4/1985 | Watanabe et al. ........... 296/204 |
| 5,102,187 A | * | 4/1992 | Harasaki ..................... 296/204 |
| 5,671,968 A | * | 9/1997 | Masuda et al. ............. 296/188 |

FOREIGN PATENT DOCUMENTS

DE        42 33 832 A1    4/1993

* cited by examiner

Primary Examiner—Stephen T. Gordon
Assistant Examiner—Patricia Engle
(74) Attorney, Agent, or Firm—Crowell & Moring, LLP

(57) ABSTRACT

A seat cross-member is provided in a vehicle with at least one platform, including longitudinal and cross-members as well as a center tunnel and chassis side members. The seat cross-member includes two profiled partial cross-members that are fastened at least on end sides to the longitudinal members and that, in the region of the center tunnel, are connected together, on the one hand, by at least one connecting element and, on the other hand, by the center tunnel. The connecting element has a bracket for a bearing of a drive shaft.

7 Claims, 6 Drawing Sheets

VEHICLE STRUCTURE

This application claims the priority of German Patent Application 199 54 296.1, filed Nov. 11, 1999, the disclosure of which is expressly incorporated by reference herein.

BACKGROUND AND SUMMARY OF THE INVENTION

The present invention relates to a vehicle with at least one platform including longitudinal and cross-members as well as a center tunnel and chassis side members.

German Patent Document DE 42 33 832 A1 discloses a floor construction of a vehicle with longitudinal and cross-members as well as a center tunnel, to which is connected a cross-member, which is connected to the chassis side member and a center tunnel. At the same time, the center tunnel is reinforced with internal reinforcements.

One object of the invention is to provide a vehicle with a seat cross-member in a platform which is stable but which guarantees optimal deforming and/or bending properties in the case of a side collision.

This invention accomplishes this object by providing two particularly configured profiled partial cross-members. Each of the profiled partial cross-members is fastened, at least on an end side, to one of the longitudinal members and, in a region of the center tunnel, exhibits a spacing. The profiled partial cross-members are connected together by at least one connecting element and by the center tunnel to form a support unit. In this way, the platform is constructed so that during a side collision, it deforms in such a sequence that, in chronological order, first a supporting rest in a chassis member region of the vehicle, then the at least one connecting element, and, last, at least a piece of at least one of the partial cross-members can be stressed to absorb the impact energy.

Advantages obtained with the invention result from the fact that, by separating the seat cross-member in the region of the center tunnel into two partial cross-members, a coordinated deformability or flexibility of the platform in this region can take place without significantly deforming the side of the platform opposite the side collision.

To this end, the seat cross-member of the platform is divided into two partial cross-members, where the end side of each partial member is fastened to the longitudinal member. In the region of the center tunnel, the partial cross-members are connected together, on the one hand, by at least one connecting element and, on the other hand, by the center tunnel. The connecting element can be designed in the shape of a plate or profile and arranged on the underside of the partial cross-members. At the same time, the free opposite ends of the partial cross-members can be connected to the connecting element by screw elements or other connecting devices.

The connecting element carries a bracket for a bearing of a drive shaft, which is arranged in a free space between the partial cross-members in the center tunnel. Thus, the connecting plate can be easily preassembled with the bracket in order to then be connected to the partial cross-members. Furthermore, disassembly by detaching the connecting element is easier than if the entire tunnel has to be disassembled.

To reinforce the divided seat cross-member in the connecting region of both partial cross-members, upright profiled reinforcement plates are provided. These reinforcement plates are connected to the partial cross-members and the connecting element. In this respect, the reinforcement plates can be fastened with the partial cross-members as well as with their angled, upright legs to a tunnel profile by foot-sided rests.

The connecting element is arranged on the underside of the partial cross-members and connected to the same using fasteners, such as screws. Between the two partial cross-members, a specific deformation and bending region for a side collision is formed so that the region of the platform opposite the side collision is not, or is only insignificantly, deformed. At least the bearing bracket remains largely undamaged. In addition, energy is absorbed by deformation of the connecting element.

To achieve a locally predefined bending or deforming zone of the partial cross-member in the fastening region for the connecting element, the seat cross-member is fastened with its one external end to the longitudinal member. The cross-member runs between this and an internal chassis member. A supporting rest is connected to the chassis member. The supporting rest is arranged on the face side relative to the seat cross-member and lies directly opposite a longitudinal supporting tube in the chassis member of the body structure. Arranging the supporting rest relative to the supporting tube and to the face side of the seat cross-member provides persons in this region with special protection. In the case of a side collision, a shape-locking connection is created between the partial cross-members and the connecting element and also between the reinforcement plates and the brackets.

Other objects, advantages and novel features of the present invention will become apparent from the following detailed description of the invention when considered in conjunction with the accompanying drawings.

One embodiment of the invention is depicted in the drawings and is described in detail in the following.

DETAILED DESCRIPTION OF THE INVENTION

Figure 1:
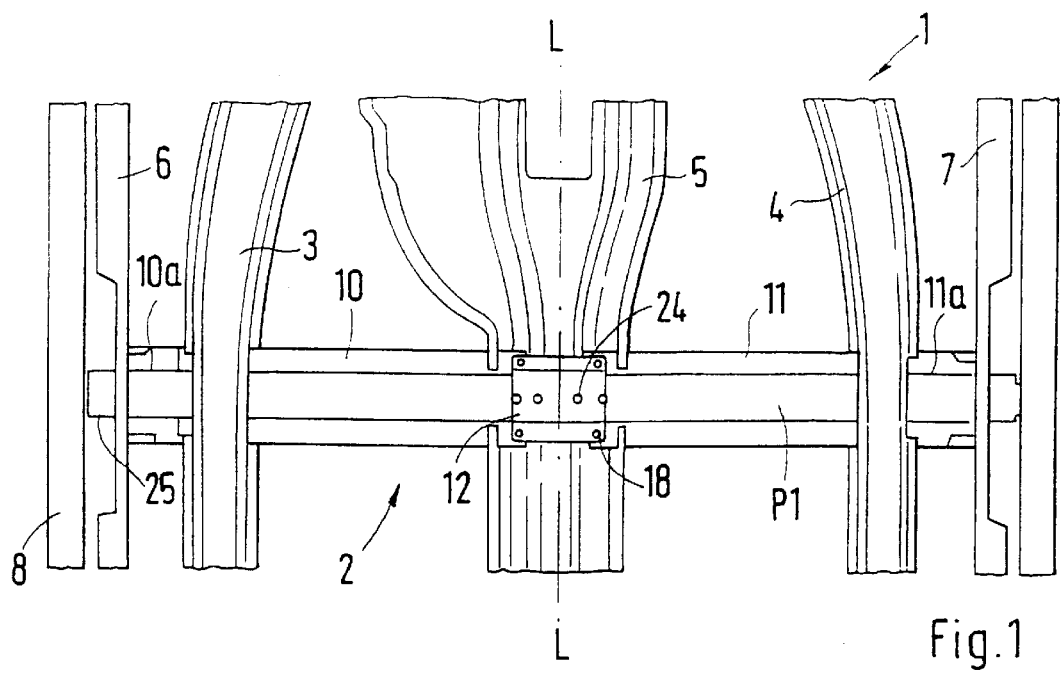
FIG. 1 is a view from the bottom of a platform with side longitudinal members, internal chassis members, and a center tunnel, and of supporting tubes and a seat cross-member with a connecting element.
Figure 2:
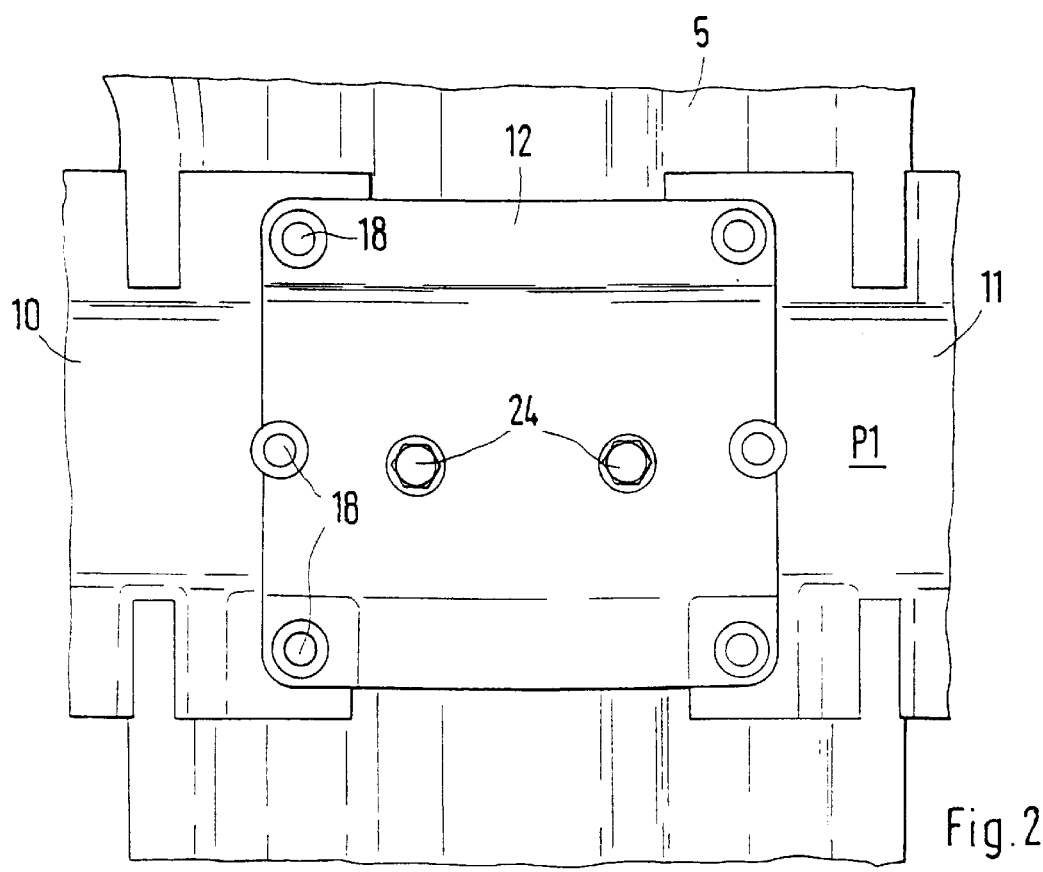
FIG. 2 is an enlarged view of the connecting element between the partial cross-members.
Figure 3:
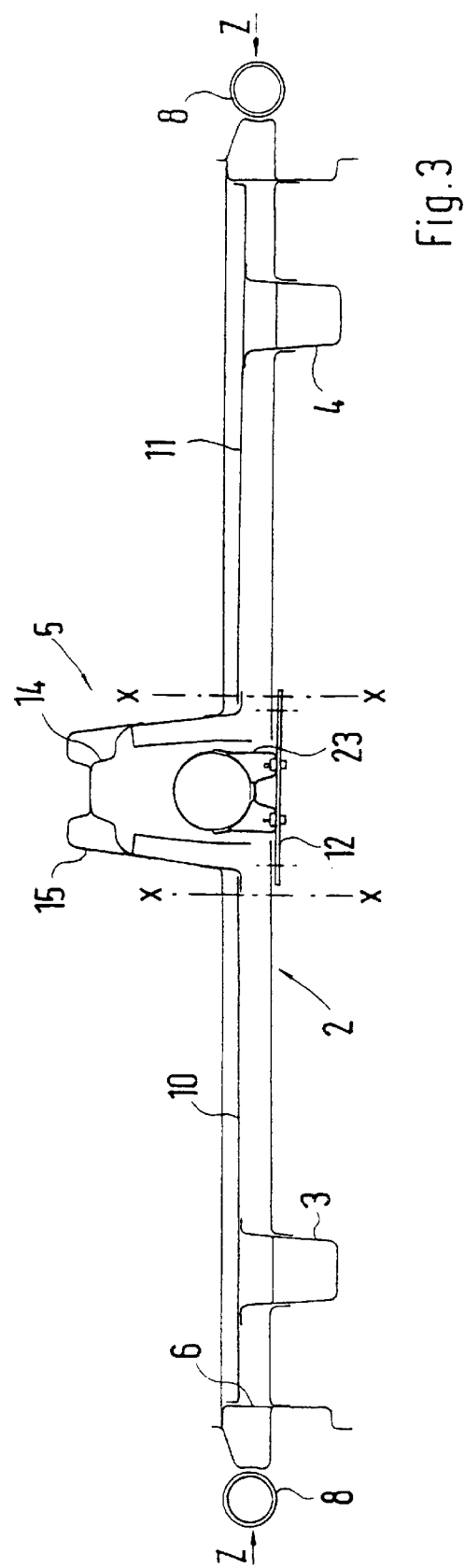
FIG. 3 is a cross sectional view of the seat cross-member with the center tunnel, the connecting element and a bearing bracket.

FIG. 1 in conjunction with FIG. 3 depicts a platform 1 of a vehicle, of which only the center section in the region of a seat cross-member 2 is shown. The platform 1 comprises in essence two longitudinal members 3, 4, a center tunnel 5, and two internal chassis members 6 and 7. In addition to these chassis members 6 and 7, there is on the outside a longitudinal supporting tube 8 in the chassis member of the side members of the vehicle body, which is not shown in detail.

The seat cross-member 2 comprises in essence two partial cross-members 10, 11, which are divided approximately in the vehicle longitudinal center axis L—L, (shown in FIG. 1) and exhibit a spacing (a), (shown in FIG. 1). These members 10, 11 are connected together on the underside by way of a connecting element 12. The connecting element 12 can be designed in the shape of a plate or profile. Furthermore, the partial cross-members 10, 11 are held by the center tunnel 5, which can comprise two profile elements 14 and 15. These connecting areas are reinforced by two reinforcement plates 16, 17.

Figure 4:
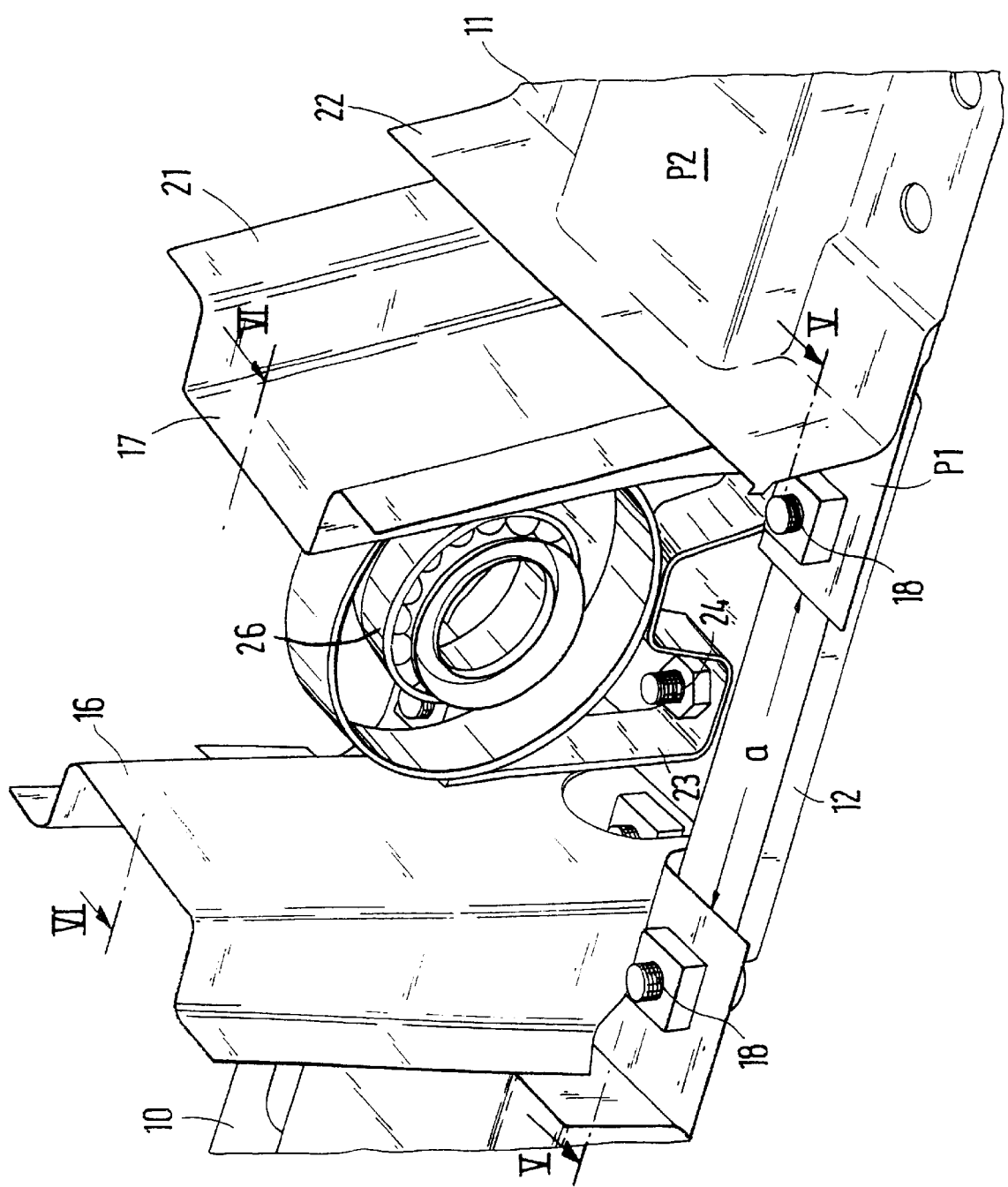
FIG. 4 is a schematic drawing of the seat cross-member with the connecting element, a reinforcement plate and the bearing bracket.
Figure 5:
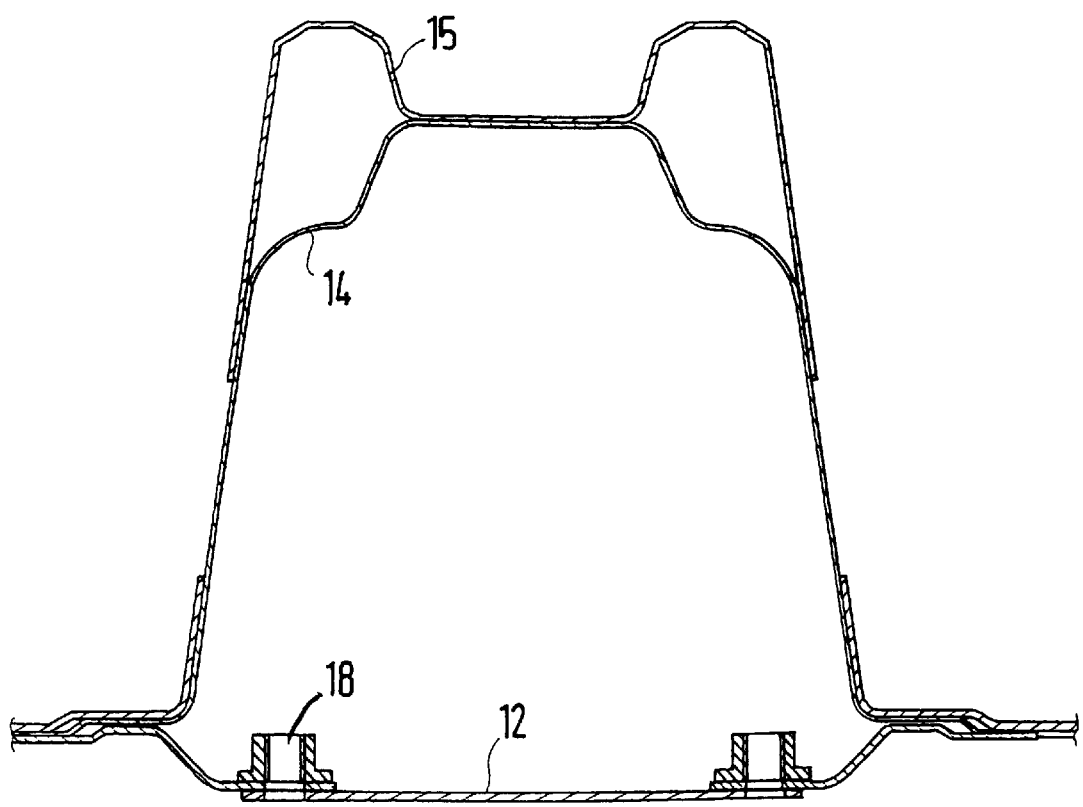
FIG. 5 is a sectional view along the line V—V of FIG. 4 in which the center tunnel in FIG. 4 is not illustrated.
Figure 6:
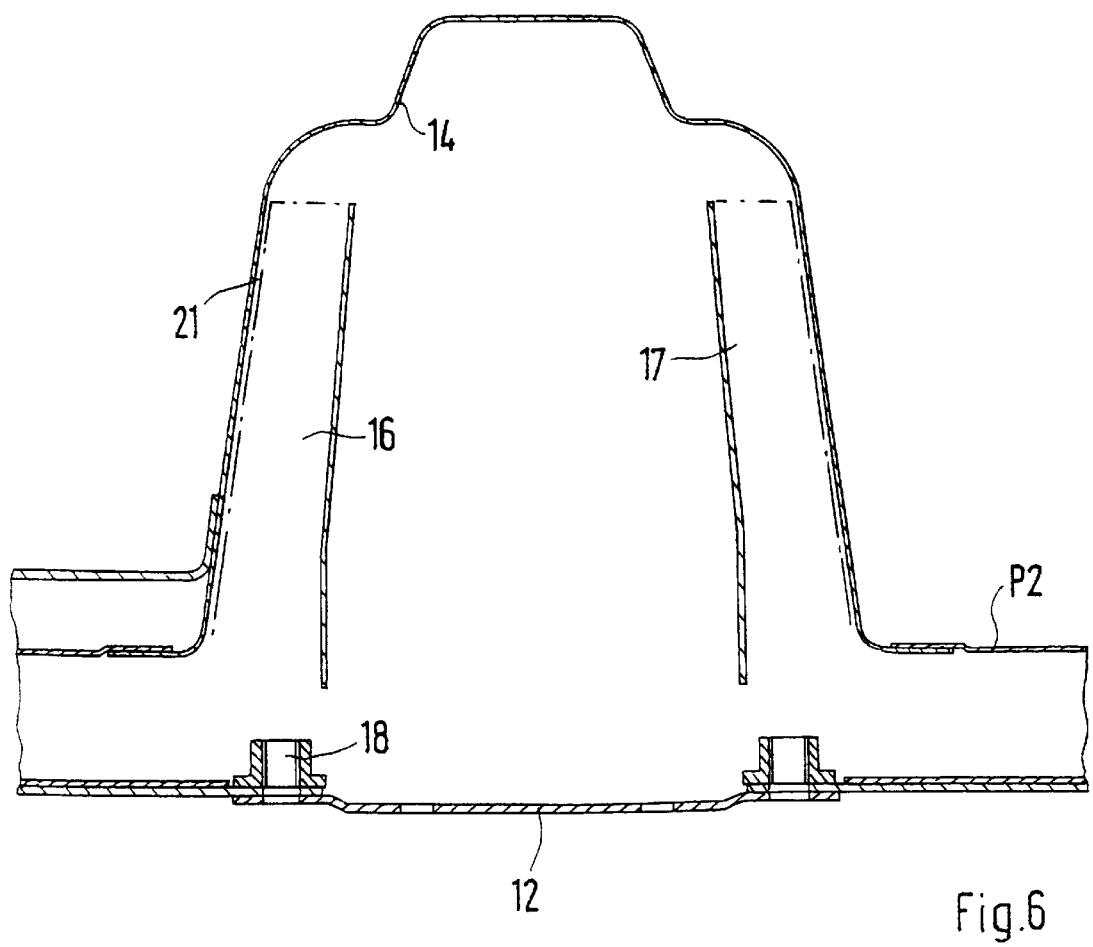
FIG. 6 is a sectional view along the line VI—VI of FIG. 4 in which the center tunnel in FIG. 4 is not illustrated.
Figure 7:
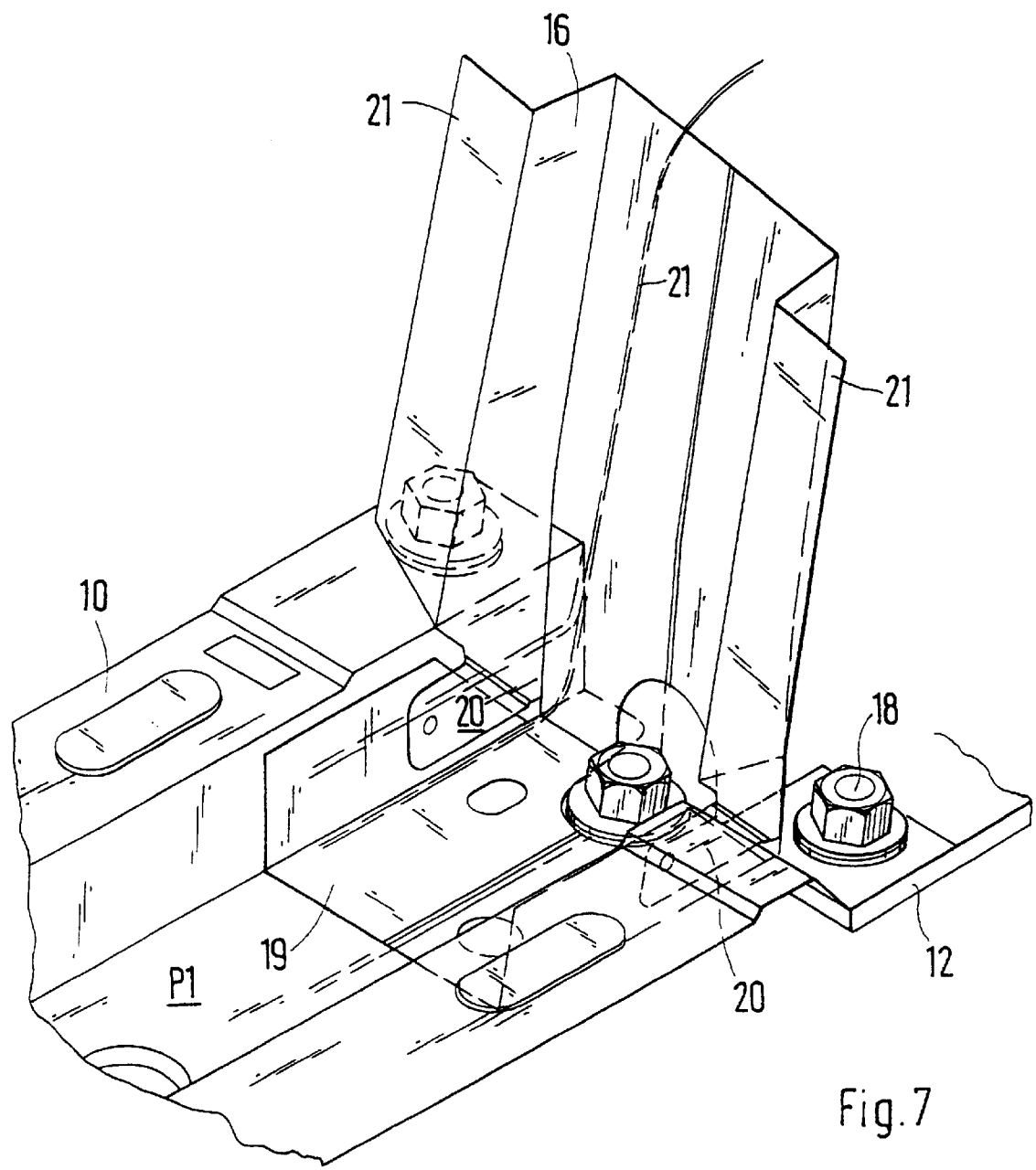
FIG. 7 is a schematic drawing of a partial cross-member of the seat cross-member with connection of the reinforcement plate.

The partial cross-members 10, 11 comprise two profiles P1, P2, which represent in their entirety the seat cross-member 2. They are connected together with the connecting element 12 at opposite ends by way of screw connections 18. As FIG. 4 shows in detail in conjunction with FIG. 7, the bottom profile members P1 of the partial cross-members 10, 11 are connected to the reinforcement plates 16, 17, which are arranged upright and exhibit rests 19, 20 on the foot side. These rests can be fastened to the partial cross-members 10, 11, for example, by spot welding. The cross section of the one rest 19 is designed as a U-shaped profile and forms a bent down extension of the profile base body, whereas the other rest 20 forms an extension of the legs of the profile base body.

The reinforcement plates 16, 17 exhibit outwardly facing, bent down legs 21, which are connected to the center tunnel profile 14 and to the top profile P2 of the partial cross-members 10, 11. Each end of the partial cross-members exhibits for this purpose an upright folded edge 22.

Held on the connecting element 12 is a bracket 23 for a bearing 26 of a drive shaft. This bracket 23 is fastened with screw connections 24 to the connecting element 12. The sides of the bracket 23 are enclosed by the reinforcement plates 16, 17.

As depicted in detail in FIG. 1, each partial cross-member 10, 11 runs up to a longitudinal member 3, 4 and is connected to the same. Between the internal chassis members 6, 7 and one of the longitudinal members 3, 4 is a piece 10a, 11a of one of the cross-members 10, 11. In the case of a side collision in the direction Z of the arrow against the vehicle, the external supporting tube (8) is forced against at least one supporting rest (25), which has a face that is held relative to the seat cross-member (2). The impact is absorbed by the partial cross-member (10, 11) in such a manner that the connecting element 12 deforms between the planes x—x with subsequent block formation of the bearing bracket 23 with respect to the upright reinforcement plates 16, 17. The pieces 10a, 11a of the seat cross-member are more deformed upon impact than the cross-members 10, 11 themselves. The sequence of deformation of the platform in the region of the seat cross-member during a side collision runs in such a manner that, first the supporting rest 25 in the chassis member region of the vehicle, then the connecting element 12, and last the partial cross-members 10, 11 and/or the pieces 10a, 11a can be stressed to absorb the impact energy. Deformations of the components of the platform can also overlap each other. The opposing partial cross-member remains largely undeformed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle with at least one platform, comprising longitudinal members and cross-members as well as a center tunnel and chassis side members, wherein a seat cross-member of the platform comprises two of said cross-members which are profiled partial cross-members, each of said profiled partial cross-members being fastened at least on an end side to one of the longitudinal members, and in a region of the center tunnel, exhibiting a spacing, wherein said profiled partial cross-members are connected together by at least one connecting element and by the center tunnel to form a support unit, and wherein the platform, during a side collision, deforms in such a sequence that, in chronological order, first a supporting rest in a chassis member region of the vehicle, then the at least one connecting element, and, last, at least a piece of at least one of the partial cross-members can be stressed to absorb the impact energy.

2. Vehicle with at least one platform, comprising longitudinal members and cross-members as well as a center tunnel and chassis side members, wherein a seat cross-member of the platform comprises two of said cross-members which are profiled partial cross-members, each of said profiled partial cross-members being fastened at least on an end side to one of the longitudinal members, and in a region of the center tunnel, exhibiting a spacing, wherein said profiled partial cross-members are connected together by at least one connecting element and by the center tunnel to form a support unit, wherein the at least one connecting element is arranged on an underside of the profiled partial cross-members and connected, using at least one fastener, to the free opposite ends of the partial cross-members, and wherein the platform, during a side collision, deforms in such a sequence that, in chronological order, first a supporting rest in a chassis member region of the vehicle, then the at least one connecting element, and, last, at least a piece of at least one of the partial cross-members can be stressed to absorb the impact energy.

3. Vehicle with at least one platform, comprising longitudinal members and cross-members as well as a center tunnel and chassis side members, wherein a seat cross-member of the platform comprises two of said cross-members which are profiled partial cross-members, each of said profiled partial cross-members being fastened at least on an end side to one of the longitudinal members, and in a region of the center tunnel, exhibiting a spacing, wherein said profiled partial cross-members are connected together by at least one connecting element and by the center tunnel to form a support unit, wherein the at least one connecting element carries a bracket for a bearing of a drive shaft, wherein said bracket is arranged in a free space between the profiled partial cross-members, which are spaced apart at a distance, in the center tunnel, and wherein the platform, during a side collision, deforms in such a sequence that, in chronological order, first a supporting rest in a chassis member region of the vehicle, then the at least one connecting element, and, last, at least a piece of at least one of the partial cross-members can be stressed to absorb the impact energy.

4. Vehicle with at least one platform, comprising longitudinal members and cross-members as well as a center tunnel and chassis side members, wherein a seat cross-member of the platform comprises two of said cross-members which are profiled partial cross-members, each of said profiled partial cross-members being fastened at least on an end side to one of the longitudinal members, and in a region of the center tunnel, exhibiting a spacing, wherein said profiled partial cross-members are connected together by at least one connecting element and by the center tunnel to form a support unit, wherein the at least one connecting element carries a bracket for a bearing of a drive shaft, and wherein said bracket is arranged in a free space between the profiled partial cross-members, which are spaced apart at a distance, in the center tunnel, further comprising upright, profiled reinforcement plates connected to both the partial cross-members and the connecting element, which exhibit between them the bearing bracket, the reinforcement plates being held on the partial cross-members by foot-sided rests, wherein the profiled reinforcement plates include angled, upright legs fastened to a tunnel profile, and wherein the platform, during a side collision, deforms in such a sequence that, in chronological order, first a supporting rest in a chassis member region of the vehicle, then the at least one connecting element, and, last, at least a piece of at least one of the partial cross-members can be stressed to absorb the impact energy.

5. Vehicle with at least one platform, comprising longitudinal members and cross-members as well as a center tunnel and chassis side members, wherein a seat cross-member of the platform comprises two of said cross-members which are profiled partial cross-members, each of said profiled partial cross-members being fastened at least on an end side to one of the longitudinal members, and in a region of the center tunnel, exhibiting a spacing, wherein said profiled partial cross-members are connected together by at least one connecting element and by the center tunnel to form a support unit, wherein the at least one connecting element is arranged on the underside of the partial cross-members and is connected in such a manner to the partial cross-members by at least one fastener that, in the case of a side collision, a defined deformation or flexural region, which lies between planes in one segment, is formed between the partial cross-members, and wherein the platform, during a side collision, deforms in such a sequence that, in chronological order, first a supporting rest in a chassis member region of the vehicle, then the at least one connecting element, and, last, at least a piece of at least one of the partial cross-members can be stressed to absorb the impact energy.

6. Vehicle with at least one platform, comprising longitudinal members and cross-members as well as a center tunnel and chassis side members, wherein a seat cross-member of the platform comprises two of said cross-members which are profiled partial cross-members, each of said profiled partial cross-members being fastened at least on an end side to one of the longitudinal members, and in a region of the center tunnel, exhibiting a spacing, wherein said profiled partial cross-members are connected together by at least one connecting element and by the center tunnel to form a support unit, wherein the at least one connecting element is arranged on an underside of the profiled partial cross-members and connected, using at least one fastener, to the free opposite ends of the partial cross-members, wherein the at least one connecting element arranged on the underside of the partial cross-members is connected in such a manner to the partial cross-members by at least one fastener that, in the case of a side collision, a defined deformation or flexural region, which lies between planes in one segment, is formed between the partial cross-members, and wherein the platform, during a side collision, deforms in such a sequence that, in chronological order, first a supporting rest in a chassis member region of the vehicle, then the at least one connecting element, and, last, at least a piece of at least one of the partial cross-members can be stressed to absorb the impact energy.

7. Vehicle with at least one platform, comprising longitudinal and cross-members as well as a center tunnel and chassis side members, wherein-a seat cross-member of the platform comprises two of said cross-members which are profiled partial cross-members, each of said profiled partial cross-members being fastened at least on an end side to one of the longitudinal members and, in a region of the center tunnel, exhibiting a spacing, wherein said profiled cross-members are connected together by at least one connecting element and by the center tunnel to form a support unit, wherein the seat cross-member is fastened, with one external end, to the one of the longitudinal members and runs between the one of the longitudinal members and an internal chassis member, wherein the internal chassis member exhibits a supporting rest on a face side relative to the seat cross-member, and wherein a supporting tube, which is held in a chassis member of the vehicle body, is directly opposite said supporting rest.

* * * * *